(12) United States Patent
Gatti et al.

(10) Patent No.: US 8,224,304 B2
(45) Date of Patent: Jul. 17, 2012

(54) SYSTEMS AND METHODS FOR DISAMBIGUATING ENTRIES IN A CONTACTS LIST DATABASE IMPLEMENTED ON A MOBILE DEVICE

(75) Inventors: John M. Gatti, San Diego, CA (US); Aaron L. Moore, Oceanside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 12/535,652

(22) Filed: Aug. 4, 2009

(65) Prior Publication Data

US 2011/0034156 A1 Feb. 10, 2011

(51) Int. Cl.
*H04M 3/42* (2006.01)
*G06F 3/00* (2006.01)
*G06F 7/00* (2006.01)
*G05B 19/00* (2006.01)

(52) U.S. Cl. ............... 455/415; 455/418; 455/422.1; 455/412.2; 455/566; 455/567; 715/739; 707/621; 340/5.81

(58) Field of Classification Search .............. 455/415, 455/418, 422.1, 412.2, 567; 379/88.19, 88.2, 379/88.21, 142.06, 164, 179, 373.01, 373.02, 379/373.03, 374.03; 340/5.81; 707/621, 707/692; 715/739
See application file for complete search history.

(56) References Cited

U.S. PATENT DOCUMENTS

| | | | |
|---|---|---|---|
| 6,205,204 B1* | 3/2001 | Morganstein et al. | 379/67.1 |
| 6,912,540 B2* | 6/2005 | Kohut et al. | 1/1 |
| 7,602,899 B1* | 10/2009 | Thenthiruperai | 379/265.02 |
| 7,706,817 B2* | 4/2010 | Bamrah et al. | 455/466 |
| 7,933,587 B1* | 4/2011 | Swan | 455/412.1 |
| 2004/0093317 A1* | 5/2004 | Swan | 707/1 |
| 2006/0035632 A1* | 2/2006 | Sorvari et al. | 455/418 |
| 2008/0045234 A1* | 2/2008 | Reed | 455/456.1 |
| 2008/0242322 A1* | 10/2008 | Scott et al. | 455/466 |
| 2008/0242343 A1* | 10/2008 | Koh et al. | 455/550.1 |
| 2010/0203874 A1* | 8/2010 | Scott et al. | 455/415 |

* cited by examiner

*Primary Examiner* — Kamran Afshar
*Assistant Examiner* — Gerald Oliver
(74) *Attorney, Agent, or Firm* — James T. Hagler (57) ABSTRACT

Methods and systems for disambiguating entries within a contacts listing database of a mobile device detect newly created contact records having a same data element (e.g., a telephone number) and alert the user. Other contact records storing the same data element may be identified. Matching contact records may be grouped and provided a group label so that when a call is received from a member of the group, the mobile device can identify the caller using the group label. Call logs can similarly be disambiguated by informing a user when a call has been made to or received from a number that matches values in data fields of more than one contact record and enabling the user to edit or augment information recorded in the call log to properly reflect the identity of the other party to the call.

56 Claims, 6 Drawing Sheets

SYSTEMS AND METHODS FOR DISAMBIGUATING ENTRIES IN A CONTACTS LIST DATABASE IMPLEMENTED ON A MOBILE DEVICE

FIELD OF THE INVENTION

The present invention relates generally to mobile devices and more specifically to methods and systems for disambiguation of entries in a contacts list database implemented on a mobile device.

BACKGROUND

Many mobile devices include features that help users call other parties and recognize parties of incoming calls. For example, users may store telephone numbers in a memory of their mobile devices in the form of a contacts list database and then access the stored number in a number of ways. For example, to access a telephone number stored in a contacts list database, the user may select a speed-dial number associated with the telephone number, type all or part of a user's name, speak a voice-tag associated with the telephone number, or select a name associated with the telephone number from a display of the contacts list database. The called telephone number is typically displayed on a screen of the mobile device. If a label, such as a first name, a last name, an image or photograph, a location or a company name, is associated with the called number, the label may also be displayed on the screen.

When a user receives a call, a mobile device also typically displays the number of the calling party, which is typically provided by the cellular telephone network as part of the incoming call information. If the calling party's number is stored in the contacts list database, the mobile device may also display a label, name, image or other information associated with the number of the calling party.

If two or more contacts share a common number, then when an incoming call is received, a label associated with one contacts in the contacts list database may be displayed. However, the displayed label may not properly identify the actual caller. For example, the contacts list database may contain an entry for Bob Smith that includes his mobile device number and his home telephone number. The contacts list database may also contain an entry for Bob Smith's wife Susie Smith that includes her mobile device number and her home telephone number, which is also Bob Smith's home telephone number. If Susie Smith calls from her mobile device, the display will properly identify the caller as Susie Smith. If, however, Susie Smith calls from the home telephone number, the display may indicate that the incoming call is from Bob Smith or from Susie Smith.

As another example, an office telephone number may be shared by any number of employees. If the contacts list database includes contact information for more than one of the employees, the display may identify an incoming call from the office telephone number as originating from any one of the employees on the contacts list database.

SUMMARY

Various embodiments provide methods and systems for disambiguating contact records in a contacts list database, for displaying caller identifying information of incoming calls, and for associating a shared telephone number with a particular party in a log file. Embodiments are also provided that allow users to define the information that is displayed when a call is received from a shared telephone number or when a shared telephone number is stored in a call log.

In an embodiment, when an incoming call is received, the telephone number of the calling party may be compared to telephone numbers stored in a contacts list database. If the telephone number of the calling party matches a single entry in the contacts list database, the contact information associated with the telephone number of the calling party may be displayed. If the telephone number of the calling party matches multiple entries in the contacts list database, the contact information associated with any one of the entries in the contacts list database may be displayed.

In another embodiment, a contacts list database may associate parties who share a common telephone number with a group identifier or group record. When an incoming call is received, the telephone number of the calling party may be compared to telephone numbers stored in the contacts list database. If the telephone number of the calling party matches multiple entries in the contacts list database linked to a group, a label associated with the group may be displayed. Alternatively, the group label and selected contact information of group members may be displayed.

DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

Various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, the term "mobile device" encompasses, for example, cellular telephones, personal data assistants (PDA) with cellular telephone, smart telephones and other processor-equipped devices that may be developed in the future that may be configured to permit a user to make and receive telephone calls, to implement a contacts list database and to interact with that contacts database, to address and send text messages, to address and send e-mail messages, and to implement a log of outgoing calls and incoming calls.

As used herein the term "contacts list database" encompasses a searchable data structure configured to store and provide access to contact list records each associating at least one "label" with at least one telephone number and optionally with other contact information. Such data structures are commonly implemented on mobile devices and referred to variously as address books, electronic phone books, electronic directories, etc., all of which are encompassed within the term contacts list database used herein. A contacts list database may include a plurality of data records, with each data record associated with a contact entry and made up of a plurality of data fields or elements.

As used herein, the term "label" encompasses a value of a data field within a contacts list data record in a format defined the contacts list database. For example, a label may include a first name field, a second name field, a nickname field, an address field, a location field, telephone number field, and a group field. As a further example, the identifier could be the contacts name plus the phone number.

As used herein, the term "contact information" encompasses any and all information about a contact that may be stored in the data elements within a data record in a contacts list database, including, for example, a home telephone number, a business telephone number, a cellular number, an e-mail address, an instant message user name, a photograph, an icon, a custom ringer or ring tone, and a customer video ringer or ring tone. As used herein, the term "record element" may refer to a label or contact information.

Modern cellular telephone services typically provide mobile devices with the telephone number of incoming calls which is sometimes referred to as the calling line identification. Thus, when a user receives a call on a mobile device, the number of the calling party is typically displayed. If the calling party's number is stored in the contacts list database, the mobile device may also use the incoming telephone number to locate a data record within the contacts list database with a data field value matching the calling telephone number. If a data record is located in this manner, the mobile device may use the record contents to display a label (e.g., a name and/or photograph) or other information associated with the number of the calling party. Such utilities are so widely implemented that users typically rely on the information displayed on their mobile devices when deciding whether and how to answer an incoming telephone call.

If two or more contacts share a common number and both contacts have been stored in the contacts list database with entries including that common number, an incoming call from that common number can result in ambiguity. Heretofore, mobile devices have had no mechanism for dealing with such ambiguity, so when an incoming call is received from a telephone number associated with multiple contact data records, information associated with the first identified record in the contacts list database, for example, may be displayed. However, the displayed label may not properly identify the actual caller.

For example, the contacts list database may contain an entry for Bob Smith that includes his mobile device number and his home telephone number. The contacts list database may also contain an entry for Bob Smith's wife, Susie Smith, which includes her mobile device number and her home telephone number, which is the same home phone number stored in the contact data record for Bob Smith. If Susie Smith calls from her mobile device, the display will properly identify the caller as Susie Smith. If, however, Susie Smith calls from the home telephone number, the display may indicate that the incoming call is from Bob Smith or from Susie Smith.

As another example, an office having a private branch exchange (PBX) telephone system may have one number shared by any number of employees that may be provided as the calling line ID. If a user's contacts list database includes contact information for more than one of the employees, an incoming call with that office's common calling line ID may result in a display of one, though not necessarily the correct one of the employees in the contacts list database. As a result, a user may be misled regarding the identity of the caller.

While the problems of ambiguous contacts list database entries can cause confusion when incoming calls are received from common numbers, problems may also arise when outgoing calls are made. Typical mobile devices may be configured to maintain log files of outgoing and incoming calls. Such call log files can be very useful to users since they typically include the telephone number called or calling along with the date and time of call and often the call duration. Such information may be useful to users who need to keep track of their telephone communications, such as sales and marketing professionals. The ambiguity that arises when a single telephone number is shared by multiple parties can also cause ambiguity in the call log files stored on a mobile device. For example, if a call is made on a mobile device to a shared telephone number, the called number cannot be unambiguously associated with any one of the entities in the contacts list database that includes the called telephone number. Similarly, if a call is received by the mobile device, the incoming telephone number cannot be unambiguously associated with any one of the entities associated with the called telephone number. Thus, the call log may identify a wrong person as the called or calling party.

Mobile devices also typically provide utilities for entering and storing data in a contacts list database. The utility may provide a user with various prompts to lead the user through a data entry sequence. To disambiguate contacts list database records or at least reduce some of this ambiguity, various embodiments provide methods and systems for identifying potential ambiguous records (i.e., those with a common data field value, like a common telephone number), creating contact records in a contacts list database, for displaying caller identifying information of incoming calls, and for associating a shared telephone number with a particular party in a log file. Embodiments are also provided for allowing users to define the information that is displayed when a call is received from an ambiguous (i.e., shared) telephone number.

Figure 1:
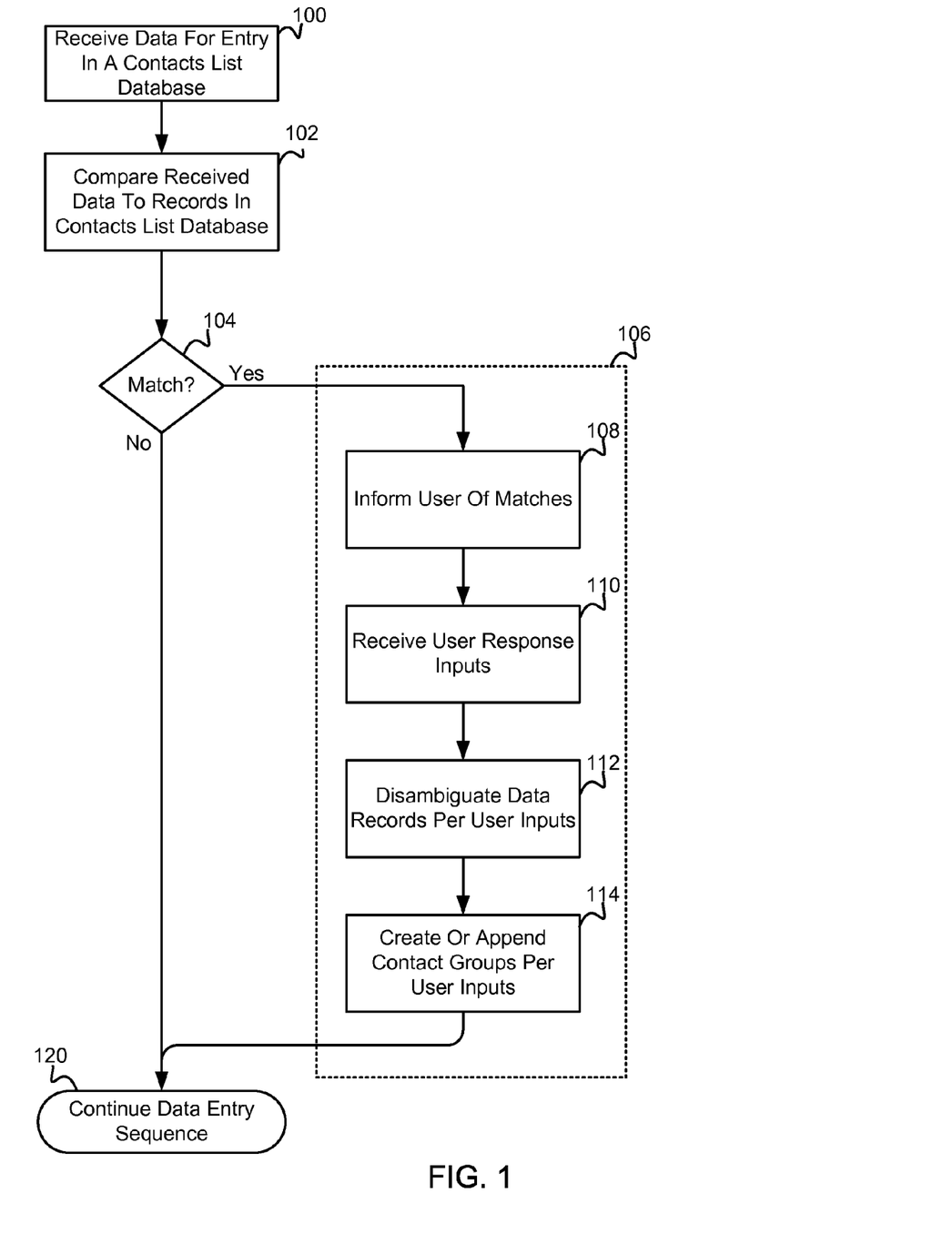
FIG. 1 is a process flow diagram illustrating creation of a record in a contacts list database of a mobile device according to an embodiment.

FIG. 1 is a process flow diagram illustrating an embodiment method that may be implemented when a record in a contacts list database of a mobile device is first created Implementing this method alerts users to duplicate contact entries, new contact records that share a common number with one or more other entries, and other potential sources for contact ambiguity.

When a user creates a new record within a contacts list database, input data is received by the mobile device, step 100. For example, a user may enter a contact's name, address, telephone number, nickname or other contract entries using a key pad of the mobile device, by retrieving data from a call log file stored in an internal memory of the mobile device, by retrieving data received within a text message sent to the mobile device, or by highlighting a data received in an e-mail sent to the mobile device.

A processor of the mobile device may be configured to search the existing data records within the contacts lists database for entries matching the entered data, step 102. This process may involve using the entered data as a look up value to identify matching record entries or by sequentially comparing the data entry to data field values stored in every record within the contacts list database to determine if there are any matching data record entries, determination 104. Such search and match functions may be performed by a processor executing an application stored in a memory of the mobile device. When no match is found (i.e., determination 104="No"), a display may be generated prompting the user to continue the data entry sequence to complete entry of the contact's information (e.g., name, address, etc.) or to indicate whether the received telephone number should be saved, step 120.

When a match is found (i.e., determination 104="Yes"), the data entry sequence may be augmented with additional sequences, step 106. For example, the user may be informed of the matches, (step 108) and provide responsive inputs based on the matches and how the user is to manage the matching data step 110. The data records may be disambiguated based on the user inputs (step 112) and/or grouped according to the user inputs (step 114). When the additional sequences have been completed, the user may continue the data entry sequence.

The matching determination (step 104) operates on the data received during the data entry sequence and may trigger the augmentation of data entry sequences (step 106). The augmentation of the data entry sequences (step 106) may be triggered by a match on any field in a data record. For example, the received data may be a telephone number, a name, an address, a nickname, or a group label.

Since the most common form of contact ambiguity will involve common telephone numbers, the following example embodiments refer to telephone number entries. However, the references to telephone numbers are intended to be but one example of contact information that may be received and disambiguated, and are not intended to be limiting. Thus, the claims are not intended to be limited to telephone number elements unless specifically recited.

Figure 2:
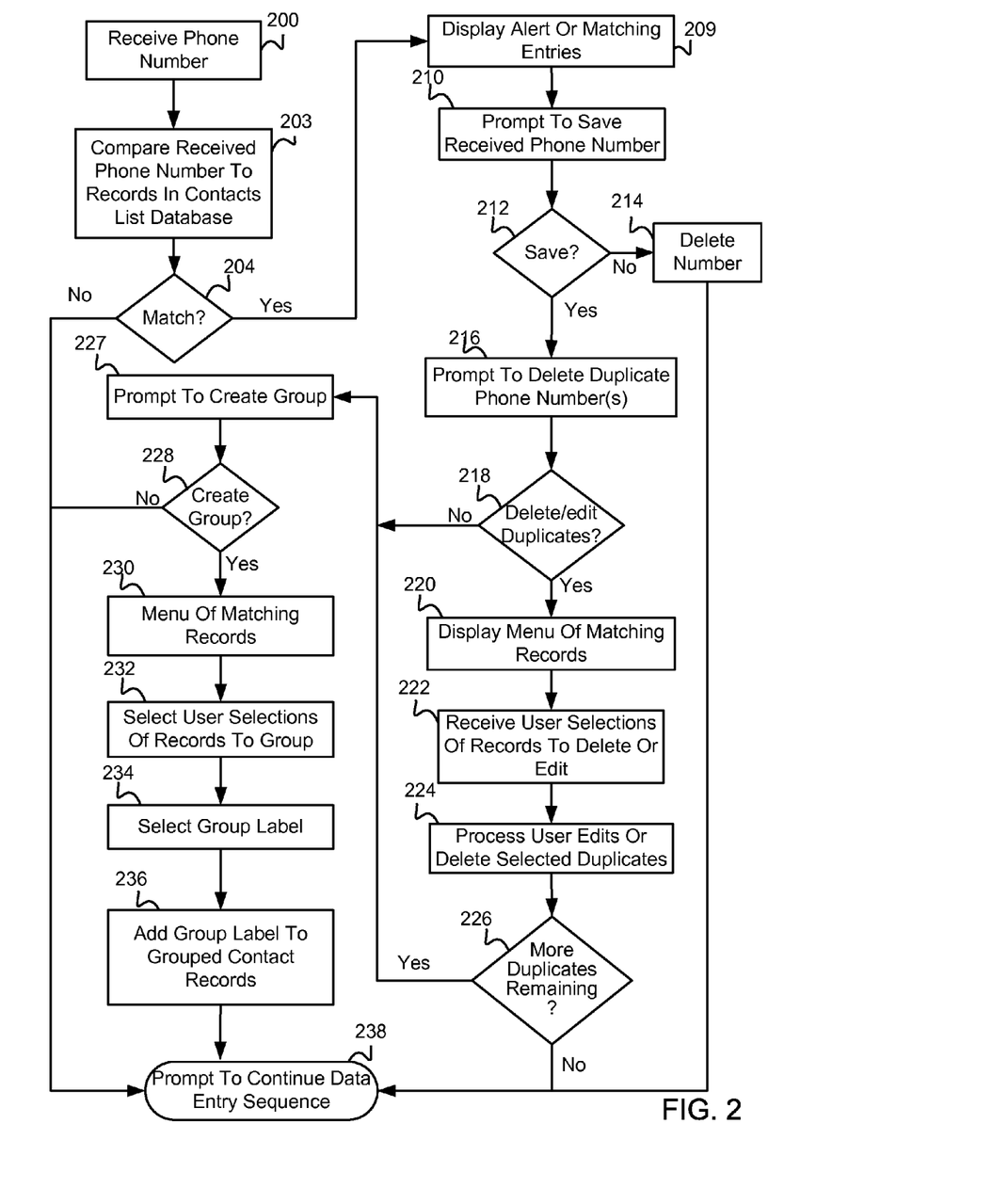
FIG. 2 is a process flow diagram illustrating processing of a telephone number entry in a contacts list database of a mobile device according to an embodiment.

FIG. 2 is a process flow diagram illustrating an embodiment method that may be implemented when a record in a contacts list database of a mobile device is first created or modified. Implementing this method within the contacts list database record creation and editing process can alert users to duplicate contact entries as users designate the entries for storage in the database. In this context, a duplicate contact entry occurs when a new contact record includes a number or element content within a data field that matches a number or element content within a data field of one or more other contact records. As described above, common numbers or element content in multiple contact data records can lead to ambiguity. To avoid such ambiguities, the example embodiment illustrated in FIG. 2 alerts users to such sources of ambiguity as a record in the contacts list database is created, giving users an opportunity to address or resolve the ambiguity before the record is saved.

When a user creates a new contact record or edits an existing contact record within a contacts list database, a telephone number may be received by the mobile device, step 200. For example, while creating a data record for a new contact a user may enter the contact's telephone number using a key pad of the mobile device. As is well known, users may also identify a telephone number to be saved in a new contacts list database record or added to an existing contact record by retrieving a dialed or incoming telephone number from a call log file stored in an internal memory of the mobile device, by highlighting a telephone number received within a text message sent to the mobile device, or by highlighting a telephone number received in an e-mail sent to the mobile device. In some situations when a new contact record is being created or an existing record is being edited the new contact's telephone number may be entered first, such as when the number is selected from a call log, followed by entry of the contacts name and other information. In other situations users may enter the new contact's name and address before the telephone number.

Regardless of the method of entering the telephone number or the order in which contact data information is entered, when the telephone number is received, the mobile device processor may be configured to search the existing data records within the contacts lists database for data field entries matching the received number, step 203. This process may involve using the received telephone number as a look up value to identify matching record entries or by sequentially comparing the received telephone number to field values stored in every record within the contacts list database to determine if there are any matching data record entries, determination 204. When no match is found (i.e., determination 204="No"), a display may be generated prompting the user to continue the contact data entry sequence, step 238, such as a menu prompt to reenter the telephone number, enter the next data field (e.g., name, address, etc.), save the entered data, or abort the data entry sequence.

When a match is found (i.e., determination 204="Yes"), an alert may be displayed informing the user of potential ambiguity, step 209. In an embodiment, the alert may display the records with matching telephone number data fields or information sufficient to enable a user to recognize or locate those records. Additionally, a prompt may be displayed requesting input from the user that enables the user to indicate whether the received telephone number should be saved, step 210. Prompting the user to whether the entered telephone number should be saved gives users an opportunity to correct an incorrectly entered telephone number or abort entry of a duplicate contact record, as may be appropriate when the ambiguity is unintentional. Thus, when the user elects not to save the telephone number (i.e., determination 212="No"), the entered telephone number may be deleted, step 214, and a display may be generated prompting the user to continue the contact data entry sequence, step 238, such as a menu prompt to reenter the telephone number, enter the next data field (e.g., name, address, etc.), save the entered data, or abort the data entry sequence.

When the user elects to save the telephone number (i.e., determination 212="Yes"), a menu prompt may be displayed giving the user an option to indicate whether one or more duplicate telephone numbers are to be edited or deleted, step 216. For example, a user may recognize from the duplicate record display that the entered telephone number matches that of a contact no longer at that number (e.g., as may occur when there is a personnel change at a company), in which case the existing record may need to be edited to enter a new number or change the contact name, or deleted as it is no longer valid. As another example, an existing record with a matching telephone number may be an incomplete contact record (e.g., an entry with just a name and telephone number and no address, company name, etc.), in which case the user may elect to delete the incomplete record and save the more complete record being created in its place. If the user elects to edit or delete duplicate telephone numbers (i.e., determination 218="Yes"), the mobile device may display a menu of the contact record(s) with matched telephone numbers to enable the user to select one or more for editing or deleting, step 220. The user may indicate selected records containing duplicate telephone number entries for editing or deletion, such as by pressing a key or touching a touch screen display that generates an input received by the mobile device processor, step 222. In response to received user inputs, the processor may present selected contact records for editing or delete selected contact records from memory, step 224. The processor may implement the processes of the contacts list database application to accomplish such editing and/or deletion of contact records. For example, a user may elect to edit a name or other information in a matching contact record, edit the common telephone number in a matching contact record, or delete the common telephone number from a matching contact record to remove the potential ambiguity. As a further example, a user may elect to delete one or more matching contact records, such as a record for an individual no longer at the common telephone number or an incomplete contact record.

If the user selects no records for editing or deletion, or as each record edit or deletion process is completed, the mobile device processor may determine whether more than one contact record contains the common telephone number, determination 226. If no duplicate telephone number entries remain (i.e., determination 226="No") a display may be generated prompting the user to return to or continue the data entry sequence, step 238, such as a menu prompt to enter the next data field (e.g., name, address, etc.), save the entered data, or abort the data entry sequence.

When telephone number entries remain (i.e., determination 226="Yes") or if the user elects not to delete duplicate telephone numbers (i.e., determination 218="No"), the mobile device processor may generate a display prompting the user to indicate whether a group should be created, step 227.

If the user elects not to group the received telephone number with one or more duplicate telephone numbers (i.e., determination 228="No"), a display may be generated prompting the user to return to or continue the data entry sequence, step 238, such as a menu prompt to reenter the telephone number, enter the next data field (e.g., name, address, etc.), save the entered data, or abort the data entry sequence.

When the user elects to group the entered contact record containing the received telephone number with one or more of the contact records including the same telephone numbers (i.e., determination 228="Yes"), the mobile device processor may display the contact records containing the matched telephone number, step 230. This display may be in the form of a menu prompt to enable the user to select particular contact records to link or otherwise indicate to form a group, step 232. The user may also select a group label that may be used to associate all of the selected records within the created group, step 234. Returning to an earlier example, if the common telephone number was the home number stored in Bob Smith's and Susie Smith's respective contact records, a user may elect to group Bob Smith's and Susie Smith's contact records as a group and assign it an informative label, such as "Smith Family Home Phone."

A created group may be stored within the contacts list database in a variety of forms or data structures. In an embodiment, the group may be a separate record that contains contact information or links to the grouped contact records. In another embodiment, the group may be created as a "folder" within which the grouped contact records are stored. In a further embodiment, contact records may include a group data field and the grouped contact records may store the group label in their respective group data fields. This latter embodiment is reflected in the example method illustrated in FIG. 2 as the contact records selected to be in the user created group may be revised or edited to store the selected group label in a group data field, step 236. Other embodiments that link or associate grouped contact records together using a different data structure may perform the necessary actions to complete the group association in place of step 236. With the user's group creation process completed, a display may be generated prompting the user to return to or continue the data entry sequence, step 238, such as a menu prompt to enter the next data field (e.g., name, address, etc.), save the entered data, or abort the data entry sequence.

Figure 3:
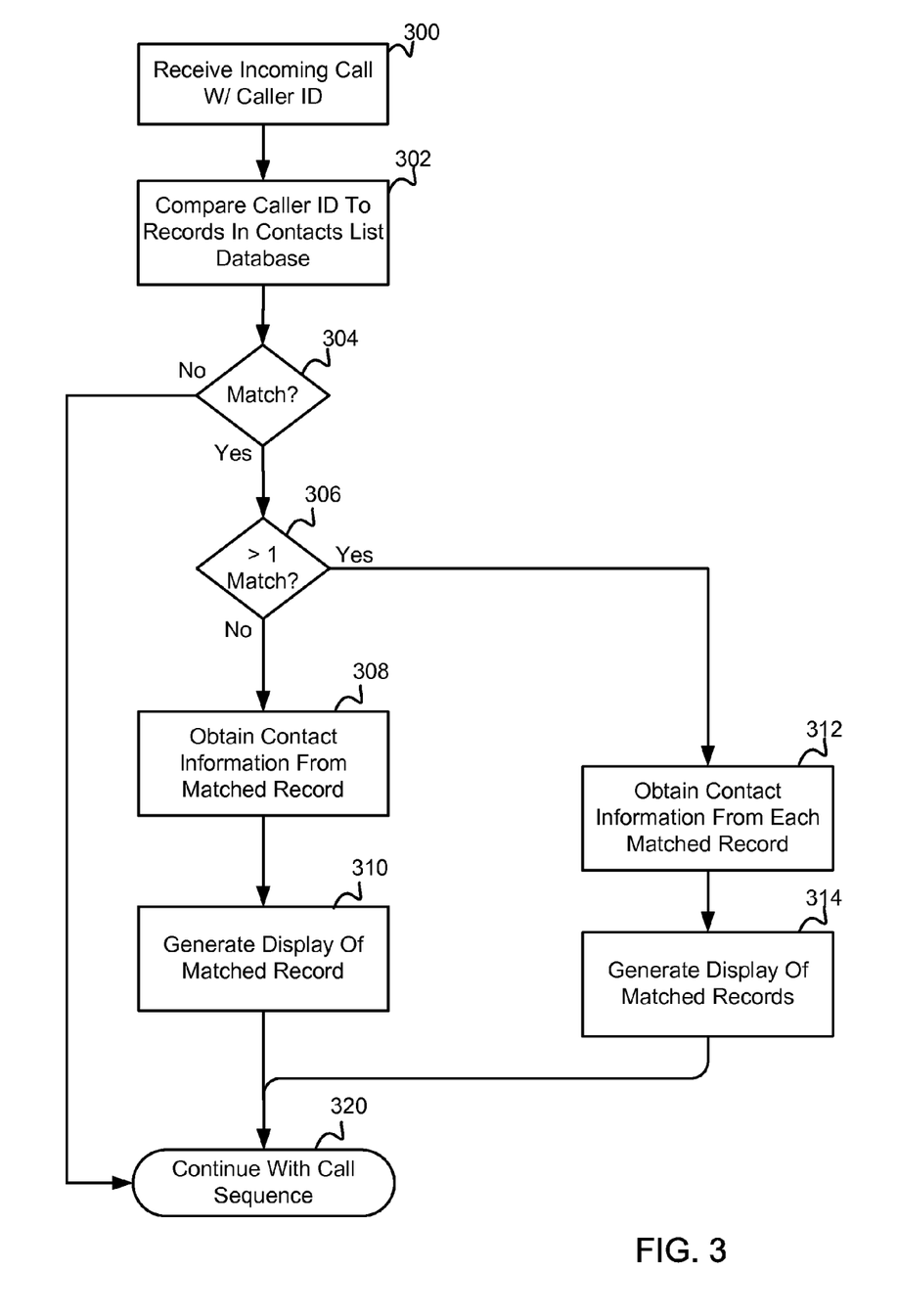
FIG. 3 is a process flow diagram illustrating the handling of an incoming call by a mobile device according to an embodiment.

As mentioned previously, embodiments of the present invention may also be invoked when a user of a mobile device receives an incoming call that includes the calling number ID. FIG. 3 is a process flow diagram illustrating the handling of an incoming call by a mobile device according to an embodiment in which no group of common telephone numbers exists. When a mobile device receives an incoming call with calling number identification information (caller ID), step 300, the mobile device processor may search the contacts list database to determine if the incoming telephone number matches a data field in any contact record, step 302. If no match is found, (i.e., determination 304="No"), no caller information will be displayed and the mobile device may continue the call receive sequence such as sounding a ring tone and waiting for the user to answer, step 320.

When a match is found (i.e., determination 304="Yes"), the processor may further determine whether the incoming telephone number matches a data field in two or more records, determination 306. This may be accomplished, for example, by continuing to search the contacts list database until all records have been compared. If a match is found only in one contact record (i.e., determination 306="No"), contact information or a display label (e.g., a photograph or name) may be obtained from the matched record, step 308. A display of the information obtained from the matched record may be generated and displayed along with or in place of the incoming telephone number, step 310, and the call sequence may continue such as sounding a ring tone and waiting for the user to answer, step 320.

If the caller ID matches data field values in two or more records (i.e., determination 306="Yes"), contact information may be obtained from each matched contact record, step 312. A display of portions of the information obtained from the matched contact records may be generated and displayed along with or in place of the incoming telephone number, step 314, and the call sequence may continue such as sounding a ring tone and waiting for the user to answer, step 320. As will be appreciated by those skilled in art, such a display may be presented using various techniques, such as scrolling the screen horizontally or vertically, so that a large amount of information may be presented.

As mentioned above with reference to FIG. 2, in an embodiment the user may designate a group and assign a group label or name to selected contact records that share a common telephone number (or other contact information). The selected information may include a label associated with the matching contact records, such as a first name, a last name, and a nickname, a photograph, an icon, an e-mail address, and a list of telephone numbers (in addition to the incoming telephone number) found in the matching record. Such a group label may be used to generate a display when a call is received from the telephone number that is common to the group. Such a display informs the user that it could be any member of the group. As mentioned in a previous example, "Smith Family Home Phone" might be an appropriate label to display whenever that a call is received from that phone number. This group label when displayed would inform the user that the call could be from anyone using the Smith's home number, and thus be less likely to mislead the user as to the caller's identity, such as might be the case if Bob Smith's or Susie Smith's name or image is displayed.

Figure 4:
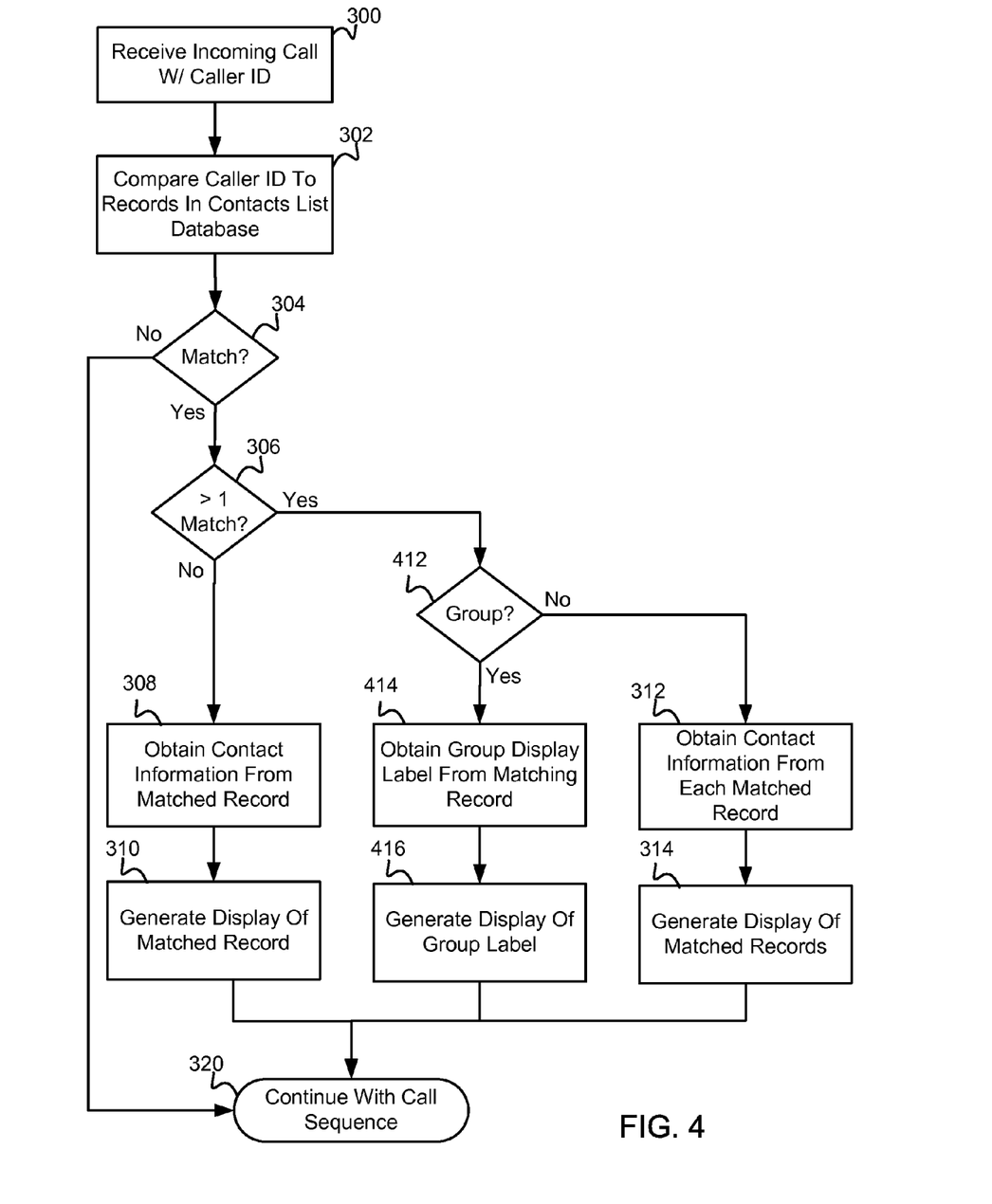
FIG. 4 is a process flow diagram illustrating the handling of an incoming call by a mobile device utilizing group labels according to an embodiment.

FIG. 4 is a process flow diagram illustrating the handling of an incoming call by a mobile device according to an embodiment utilizing group labels to disambiguate contact records. When the mobile device receives an incoming call with caller ID, step 300, the mobile device processor may search the contacts list database to determine if the incoming telephone number matches a data field in any contact record, step 302. If no match is found, (i.e., determination 304="No"), no caller information will be displayed and the mobile device may continue the call receive sequence such as sounding a ring tone and waiting for the user to answer, step 320.

When a match is found (i.e., determination 304="Yes"), the processor may further determine whether the incoming telephone number matches a data field in two or more records, determination 306. This may be accomplished, for example, by continuing to search the contacts list database until all records have been compared. If a match is found only in one contact record (i.e., determination 306="No"), contact information or a display label (e.g., a photograph or name) may be obtained from the matched record, step 308. A display of the information obtained from the matched record may be generated and displayed along with or in place of the incoming telephone number, step 310, and the call sequence may continue such as sounding a ring tone and waiting for the user to answer, step 320. Alternatively, a separate database of ambiguous records may be maintained, in which case the searching for matches could be performed first on ambiguous records which may be more likely to include a match.

If the caller ID matches data field values in two or more records (i.e., determination 306="Yes"), the processor may determine whether the matching contact records have been assigned a group label, determination 412. If a group label has been assigned (i.e., determination 412="Yes"), the group label may be obtained from one of the matching records, step 414. As mentioned above, the group linkage may be stored in the database in a variety of data structures and organizations, one of which stores the group label in a group data field of contact records associated with a group. A display of the group label may be generated and displayed along with or in place of the incoming telephone number, step 416, and the call sequence may continue such as sounding a ring tone and waiting for the user to answer, step 320. In this embodiment, when a group label has been assigned, the display of the incoming telephone number may be augmented with the group label and with selected information about the group stored in the contacts list database as determined by the user.

If a group label has not been assigned to the matched contact records (i.e., determination 412="No"), contact information may be obtained from each matched contact record, step 312. A display of portions of the information obtained from the matched contact records may be generated and displayed along with or in place of the incoming telephone number, step 314, and the call sequence may continue such as sounding a ring tone and waiting for the user to answer, step 320.

In another embodiment, the user may configure the mobile device to display the incoming telephone number, the group label, selected information about the group, and selected information about the group members.

In an embodiment, a mobile device may be configured to maintain an outgoing call log file and an incoming call log file, or a single log file recording both incoming and outgoing calls. The ambiguity that may arise when a single telephone number is shared by multiple parties can also cause ambiguity in the call log files stored on a mobile device. For example, if a call is made by a user of the mobile device to a shared telephone number, the called number cannot be unambiguously associated with any one of the contact records associated with the called telephone number. Similarly, if a call is received by the mobile device from a shared telephone number, the incoming call cannot be unambiguously associated in the incoming call log with any one of the contact records associated with the called telephone number.

Figure 5:
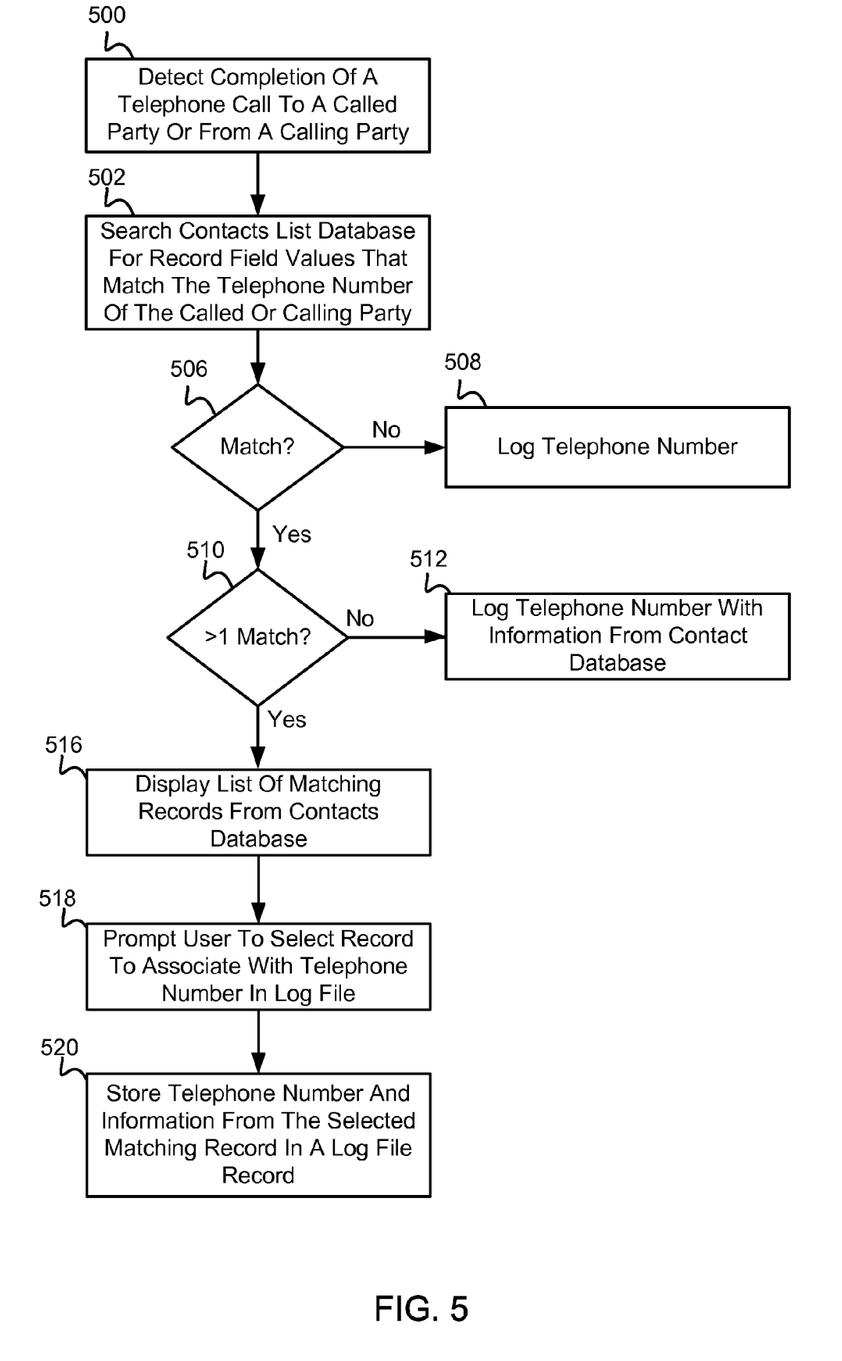
FIG. 5 is a process flow diagram illustrating management of a call log implemented on a mobile device according to an embodiment.

FIG. 5 is a process flow diagram illustrating management of a call log implemented on a mobile device according to an embodiment. When the mobile device detects termination of a call, step 500, which may be an outgoing or incoming call, the mobile device processor may search a contacts list database to determine if the other party's telephone number matches the contents of a data field in any contact record, step 502, determination 506. When no match is found, (i.e., determination 506="No"), the mobile device creates a record of the incoming or outgoing telephone number in the call log in a typical manner, step 508.

When a match is found, (i.e., determination 506="Yes"), a determination may be made as to whether the incoming or outgoing telephone number matches contents of data fields in two or more records, determination 510. As mentioned above, this process may involve continuing the search of the contacts list database until all contact records have been evaluated. If a match is found in only one record (i.e., determination 510="No"), the mobile device may record the incoming or outgoing telephone number in the call log augmented with information stored in the one matching record, step 512. For example, the call log may include the name of the called or calling contact.

If a match is found in two or more records (i.e., determination 510="Yes"), the processor may access information in the matched records (i.e., those records in the contacts list database that include a data field matching the incoming or outgoing telephone number) and use a portion of the information to generate a display, step 516. The processor may further generate a display prompting the user to select one of the matching records to associate with the incoming or outgoing call in the call log, step 518. Using an input received from the user, the processor may record the call in the call log with an entry that includes the telephone number augmented with information stored in the selected matching record, step 520. In this manner, if the processor detects a potential ambiguity, the processor can prompt the user to resolve the ambiguity before the call is recorded in the call log. Prompting the caller for this information after the call is ended, helps the user properly record the call while it is fresh in the mind.

Alternatively, the processes described above with reference to FIG. 5 may be performed at the time a call is initiated.

In an embodiment, the processor may augment the telephone number with the contact name as stored in the selected contact record. In another embodiment, the user may configure the mobile device to select particular data fields from contact records stored in the contacts lists database to be used to augment the call log numbering in the event of an ambiguous telephone number is called.

Figure 6:
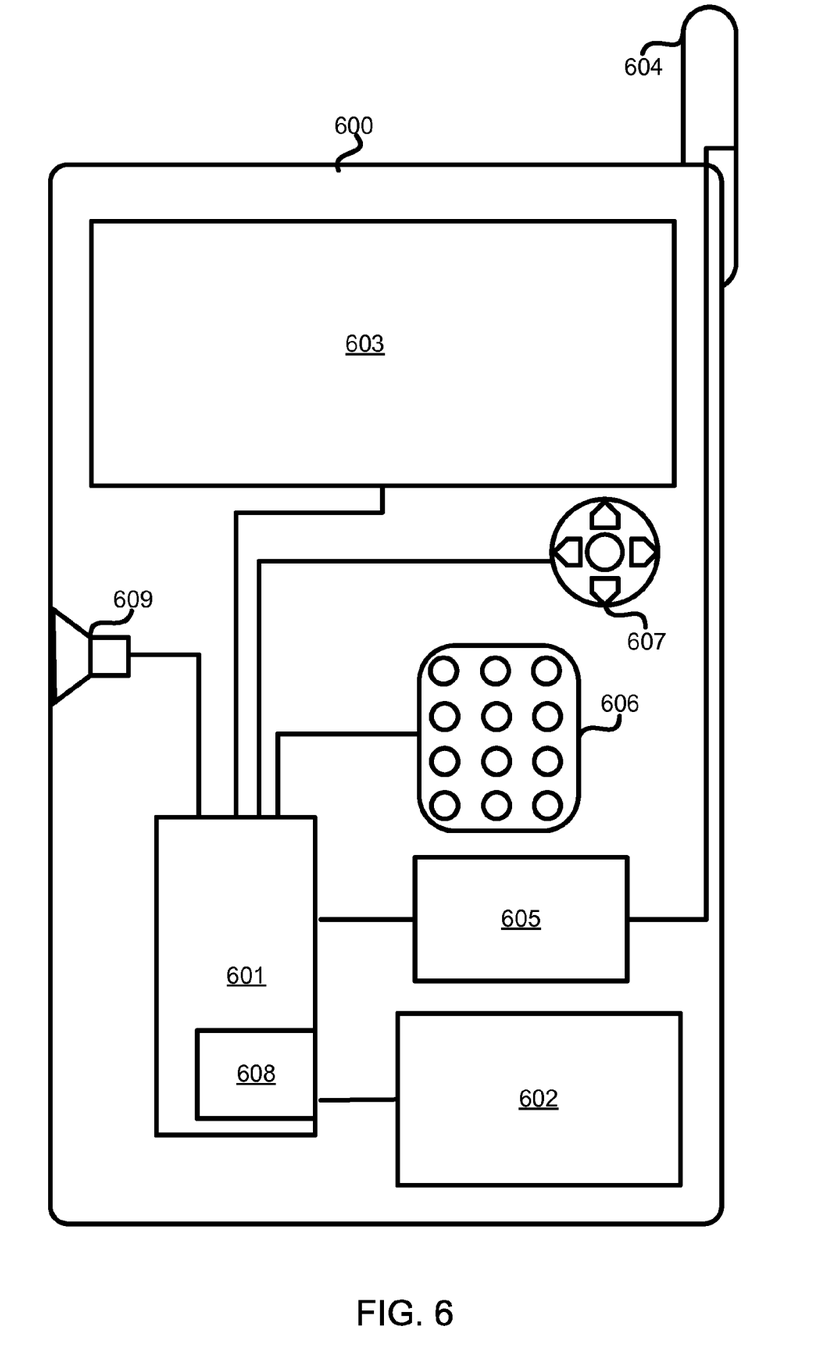
FIG. 6 is a component block diagram illustrating example components of a mobile device.

A typical mobile device suitable for use with the various embodiments will have in common the components illustrated in FIG. 6. For example, a mobile device 600 may include a processor 601 coupled to internal memory 602, and a display 603. Additionally, the mobile device 600 may have an antenna 604 for sending and receiving electromagnetic radiation that is connected to a wireless data link and/or cellular telephone transceiver 605 coupled to the processor 601. In some implementations, the transceiver 605 and portions of the processor 601 and memory 602 used for cellular telephone communications are collectively referred to as the air interface since it provides a data interface via a wireless data link. Mobile devices typically also include a key pad 606 or miniature keyboard and menu selection buttons or rocker switches 607 for receiving user inputs. Mobile devices typically also include a transducer 609 for converting electrical signals to audible signals and sound into electrical signals.

The processor 601 may be any programmable microprocessor, microcomputer or multiple processor chip or chips that can be configured by software instructions (applications) to perform a variety of functions, including maintaining a contacts list database performing the functions and methods of the various embodiments described herein. In some mobile devices, multiple processors 601 may be provided, such as one processor dedicated to wireless communication functions and one processor dedicated to running other applications. Typically, software applications may be stored in the internal memory 602 before they are accessed and loaded into the processor 601. The processor 601 may also include internal memory 608. In some mobile devices, additional memory chips (e.g., a Secure Data (SD) card) may be plugged into the device 600 and coupled to the processor 601. In many mobile devices, the internal memory 602 may be a volatile or nonvolatile memory, such as flash memory, or a mixture of both. For the purposes of this description, a general reference to memory refers to all memory accessible by the processor 601, including memory 608, separate memory elements 602, and removable memory plugged into the mobile device (not shown).

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for disambiguating entries in a mobile device contacts list database including a plurality of contact records stored in said database, each comprising a plurality of data fields, comprising:

receiving a telephone number as part of creation of a new contact record for storage in the contacts list database, the telephone number being received from one of a key pad, a message, and a log file;

comparing the received telephone number to data fields in the stored contact records;

generating a display alerting a user of the mobile device when the received telephone number matches a value stored in a first data field in more than one of the plurality of contact records;

displaying information stored in a second data field of the more than one of the plurality of contact records with a first data field value matching the received telephone number; and generating a prompt for a response from a user to associate the new contact record with a group label.

2. The method of claim 1, wherein the information stored in a second data field that is displayed comprises a contact name.

3. The method of claim 1, wherein the information stored in a second data field that is displayed comprises an image.

4. The method of claim 1, wherein the information stored in a second data field that is displayed comprises a group label assigned to the more than one of the plurality of contact records with a first data field value matching the received telephone number.

5. The method of claim 1,
further comprising:
receiving a user response identifying a group label; and
storing the new contact record comprising the received telephone number and the identified group label in the contacts list database.

6. The method of claim 1, further comprising:
generating a prompt for a response from a user to select for deletion at least one of the more than one of the plurality of contact records with a first data field value matching the received telephone number;
receiving a user input selecting for deletion at least one of the more than one of the plurality of contract records; and
deleting the selected at least one of the more than one of the plurality of contract records.

7. The method of claim 1, wherein receiving a telephone number further comprises receiving the telephone number as caller identification information as part of an incoming telephone call.

8. The method of claim 7, wherein generating the display comprises displaying the caller identifying information and information stored in a second data field of the more than one of the plurality of contact records with a first data field value matching the received telephone number the call display comprises.

9. The method of claim 8, wherein the information stored in a second data field includes a contact name.

10. The method of claim 8, wherein the information stored in a second data field includes a group label assigned to the more than one of the plurality of contact records with a first data field value matching the received telephone number.

11. A method for disambiguating entries in a mobile device contacts list database including a plurality of contact records stored in said database, each comprising a plurality of data fields, comprising:
receiving a telephone number as caller identification information as part of an incoming telephone call and receiving the telephone number as part of a call placed on the mobile device;
comparing the received telephone number to data fields in the stored records;
generating a display alerting a user of the mobile device when the received telephone number matches a value stored in a first data field in more than one of the plurality of contact records;
displaying information stored in a second data field of the more than one of the plurality of contact records with a first data field value matching the received telephone number, and
generating a prompt for a response from a user to associate the received telephone number with a group label for storage in a call log.

12. A method for disambiguating entries in a mobile device contacts list database including a plurality of contact records stored in said database, each comprising a plurality of data fields, comprising:
receiving a telephone number as caller identification information as part of an incoming telephone call and receiving the telephone number as part of a call placed on the mobile device;
comparing the received telephone number to data fields in the stored records;
generating a display comprises alerting a user of the mobile device when the received telephone number matches a value stored in a first data field in more than one of the plurality of contact records;
displaying information stored in a second data field of the more than one of the plurality of contact records with a first data field value matching the received telephone number; and
generating a prompt for a response from a user to associate the received telephone number with one of the more than one of the plurality of contact records with a first data field value matching the received telephone number for storage in a call log.

13. A mobile device, comprising:
a processor;
a memory coupled to the processor, the memory having stored therein a contacts list database including a plurality of contact records stored in said database each comprising a plurality of data fields; and
a cellular telephone transceiver coupled to the processor, wherein the processor is configured with processor-executable instructions to perform steps comprising:
receiving a telephone number as part of creation of a new contact record for storage in the contacts list database, the telephone number being received from one of a key pad, a message, and a log file;
comparing the received telephone number to data fields in the stored contact records;
generating a display alerting a user of the mobile device when the received telephone number matches a value stored in a first data field in more than one of the plurality of contact records;
displaying information stored in a second data field of the more than one of the plurality of contact records with a first data field value matching the received telephone number; and
generating a prompt for a response from a user to associate the new contact record with a group label.

14. The mobile device of claim 13, wherein the processor is further configured with processor-executable instructions such that the information stored in a second data field that is displayed comprises a contact name.

15. The mobile device of claim 13, wherein the processor is further configured with processor-executable instructions such that the information stored in a second data field that is displayed comprises an image.

16. The mobile device of claim 13, wherein the processor is further configured with processor-executable instructions such that the information stored in a second data field that is displayed comprises a group label assigned to the more than one of the plurality of contact records with a first data field value matching the received telephone number.

17. The mobile device of claim 13, wherein the processor is further configured with processor-executable instructions to perform further steps comprising:
receiving a user response identifying a group label; and
storing the new contact record comprising the received telephone number and the identified group label in the contacts list database.

18. The mobile device of claim 13, wherein the processor is further configured with processor-executable instructions to perform further steps comprising:
generating a prompt for a response from a user to select for deletion at least one of the more than one of the plurality of contact records with a first data field value matching the received telephone number;
receiving a user input selecting for deletion at least one of the more than one of the plurality of contract records; and
deleting the selected at least one of the more than one of the plurality of contract records.

19. The mobile device of claim 13, wherein the processor is further configured with processor-executable instructions such that receiving a telephone number further comprises receiving the telephone number as caller identification information as part of an incoming telephone call.

20. The mobile device of claim 19, wherein the processor is further configured with processor-executable instructions such that generating the display comprises displaying the caller identifying information and information stored in a second data field of the more than one of the plurality of contact records with a first data field value matching the received telephone number the call display comprises.

21. The mobile device of claim 20, wherein the processor is further configured with processor-executable instructions such that the information stored in a second data field includes a contact name.

22. The mobile device of claim 20, wherein the processor is further configured with processor-executable instructions such that the information stored in a second data field includes a group label assigned to the more than one of the plurality of contact records with a first data field value matching the received telephone number.

23. A mobile device, comprising:
a processor;
a memory coupled to the processor, the memory having stored therein a contacts list database including a plurality of contact records stored in said database each comprising a plurality of data fields; and
a cellular telephone transceiver coupled to the processor,
wherein the processor is configured with processor-executable instructions to perform steps comprising:
receiving a telephone number via one of receiving the telephone number as caller identification information as part of an incoming telephone call and receiving the telephone number as part of a call placed on the mobile device;
comparing the received telephone number to data fields in the stored contact records;
generating a display alerting a user of the mobile device when the received telephone number matches a value stored in a first data field in more than one of the plurality of contact records;
displaying information stored in a second data field of the more than one of the plurality of contact records with a first data field value matching the received telephone number; and
generating a prompt for a response from a user to associate the received telephone number with a group label for storage in a call log.

24. A mobile device, comprising:
a processor;
a memory coupled to the processor, the memory having stored therein a contacts list database including a plurality of contact records stored in said database each comprising a plurality of data fields; and
a cellular telephone transceiver coupled to the processor,
wherein the processor is configured with processor-executable instructions to perform steps comprising:
receiving a telephone number via one of receiving the telephone number as caller identification information as part of an incoming telephone call and receiving the telephone number as part of a call placed on the mobile device;
comparing the received telephone number to data fields in the stored contact records;
generating a display alerting a user of the mobile device when the received telephone number matches a value stored in a first data field in more than one of the plurality of contact records;
displaying information stored in a second data field of the more than one of the plurality of contact records with a first data field value matching the received telephone number; and
generating a prompt for a response from a user to associate the received telephone number with one of the more than one of the plurality of contact records with a first data field value matching the received telephone number for storage in a call log.

25. A mobile device comprising:
means for storing a plurality of contact records, wherein each contact record comprises a plurality of data fields;
means for receiving a telephone number as part of creation of a new contact record for storage in the contacts list database, the telephone number being received from one of a key pad, a message, and a log file;
means for comparing the received telephone number to data fields in the stored contact records;
means for generating a display alerting a user of the mobile device when the received telephone number matches a value stored in a first data field in more than one of the plurality of contact records;
means for displaying information stored in a second data field of the more than one of the plurality of contact records with a first data field value matching the received telephone number; and
means for generating a prompt for a response from a user to associate the new contact record with a group label.

26. The mobile device of claim 25, wherein the information stored in a second data field that is displayed comprises a contact name.

27. The mobile device of claim 25, wherein the information stored in a second data field that is displayed comprises an image.

28. The mobile device of claim 25, wherein the information stored in a second data field that is displayed comprises a group label assigned to the more than one of the plurality of contact records with a first data field value matching the received telephone number.

29. The mobile device of claim 25, further comprising:
means for receiving a user response identifying a group label; and means for storing the new contact record comprising the received telephone number and the identified group label in the contacts list database.

30. The mobile device of claim 25, further comprising:
means for generating a prompt for a response from a user to select for deletion at least one of the more than one of the plurality of contact records with a first data field value matching the received telephone number;
means for receiving a user input selecting for deletion at least one of the more than one of the plurality of contract records; and
means for deleting the selected at least one of the more than one of the plurality of contract records.

31. The mobile device of claim 25, wherein means for receiving a telephone number further comprises means for receiving the telephone number as caller identification information as part of an incoming telephone call.

32. The mobile device of claim 31, wherein means for generating the display comprises means for displaying the caller identifying information and information stored in a second data field of the more than one of the plurality of contact records with a first data field value matching the received telephone number the call display comprises.

33. The mobile device of claim 32, wherein the information stored in a second data field includes a contact name.

34. The mobile device of claim 32, wherein the information stored in a second data field includes a group label assigned to the more than one of the plurality of contact records with a first data field value matching the received telephone number.

35. A mobile device, comprising:
means for storing a plurality of contact records, wherein each contact record comprises a plurality of data fields;
means for receiving a telephone number via one of means for receiving the telephone number as caller identification information as part of an incoming telephone call and means for receiving the telephone number as part of a call placed on the mobile device;
means for comparing the received telephone number to data fields in the stored contact records;
means for generating a display alerting a user of the mobile device when the received telephone number matches a value stored in a first data field in more than one of the plurality of contact records;
means for displaying information stored in a second data field of the more than one of the plurality of contact records with a first data field value matching the received telephone number; and
means for generating a prompt for a response from a user to associate the received telephone number with a group label for storage in a call log.

36. A mobile device, comprising:
means for storing a plurality of contact records, wherein each contact record comprises a plurality of data fields;
means for receiving a telephone number via one of means for receiving the telephone number as caller identification information as part of an incoming telephone call and means for receiving the telephone number as part of a call placed on the mobile device;
means for comparing the received telephone number to data fields in the stored contact records;
means for generating a display alerting a user of the mobile device when the received telephone number matches a value stored in a first data field in more than one of the plurality of contact records;
means for displaying information stored in a second data field of the more than one of the plurality of contact records with a first data field value matching the received telephone number; and
means for generating a prompt for a response from a user to associate the received telephone number with one of the more than one of the plurality of contact records with a first data field value matching the received telephone number for storage in a call log.

37. A non-transitory computer-readable medium having stored thereon computer-executable instructions configured to cause a processor to perform operations comprising:
storing a plurality of contact records, wherein each contact record comprises a plurality of data fields;
receiving a telephone number as part of creation of a new contact record for storage in the contacts list database, the telephone number being received from one of a key pad, a message, and a log file;
comparing the received telephone number to data fields in the stored contact records;
generating a display alerting a user of the mobile device when the received telephone number matches a value stored in a first data field in more than one of the plurality of contact records;
displaying information stored in a second data field of the more than one of the plurality of contact records with a first data field value matching the received telephone number; and
generating a prompt for a response from a user to associate the new contact record with a group label.

38. The non-transitory computer-readable medium of claim 37, wherein the information stored in a second data field that is displayed comprises a contact name.

39. The non-transitory computer-readable medium of claim 37, wherein the information stored in a second data field that is displayed comprises an image.

40. The non-transitory computer-readable medium of claim 37, wherein the information stored in a second data field that is displayed comprises a group label assigned to the more than one of the plurality of contact records with a first data field value matching the received telephone number.

41. The non-transitory computer-readable medium of claim 37, having stored thereon computer-executable instructions configured to cause a processor to perform operations further comprising:
receiving a user response identifying a group label; and
storing the new contact record comprising the received telephone number and the identified group label in the contacts list database.

42. The non-transitory computer-readable medium of claim 37, having stored thereon computer-executable instructions configured to cause a processor to perform operations further comprising:
generating a prompt for a response from a user to select for deletion at least one of the more than one of the plurality of contact records with a first data field value matching the received telephone number;
receiving a user input selecting for deletion at least one of the more than one of the plurality of contract records; and
deleting the selected at least one of the more than one of the plurality of contract records.

43. The non-transitory computer-readable medium of claim 37, having stored thereon computer-executable instructions configured to cause a processor to perform operations further comprising:
receiving a telephone number further comprises at least one instruction for receiving the telephone number as caller identification information as part of an incoming telephone call.

44. The non-transitory computer-readable medium of claim 43, having stored thereon computer-executable instructions configured to cause a processor to perform operations further comprising:
displaying the caller identifying information and information stored in a second data field of the more than one of the plurality of contact records with a first data field value matching the received telephone number the call display comprises.

45. The non-transitory computer-readable medium of claim 44, wherein the information stored in a second data field includes a contact name.

46. The non-transitory computer-readable medium of claim 44, wherein the information stored in a second data field includes a group label assigned to the more than one of the plurality of contact records with a first data field value matching the received telephone number.

47. A non-transitory computer-readable medium having stored thereon computer-executable instructions configured to cause a processor to perform operations further comprising:
storing a plurality of contact records, wherein each contact record comprises a plurality of data fields;
receiving a telephone number via one of receiving the telephone number as caller identification information as part of an incoming telephone call and receiving the telephone number as part of a call placed on the mobile device;
comparing the received telephone number to data fields in the stored contact records;
generating a display alerting a user of the mobile device when the received telephone number matches a value stored in a first data field in more than one of the plurality of contact records;
displaying information stored in a second data field of the more than one of the plurality of contact records with a first data field value matching the received telephone number; and
generating a prompt for a response from a user to associate the received telephone number with a group label for storage in a call log.

48. A non-transitory computer-readable medium having stored thereon computer-executable instructions configured to cause a processor to perform operations comprising:
storing a plurality of contact records, wherein each contact record comprises a plurality of data fields;
receiving a telephone number via at least one instruction for one of receiving the telephone number as caller identification information as part of an incoming telephone call and receiving the telephone number as part of a call placed on the mobile device;
comparing the received telephone number to data fields in the stored contact records;
generating a display alerting a user of the mobile device when the received telephone number matches a value stored in a first data field in more than one of the plurality of contact records;
displaying information stored in a second data field of the more than one of the plurality of contact records with a first data field value matching the received telephone number; and
generating a prompt for a response from a user to associate the received telephone number with one of the more than one of the plurality of contact records with a first data field value matching the received telephone number for storage in a call log.

49. The method of claim 11, further comprising:
receiving a user response identifying a group label; and
storing the received telephone number and the identified group label in call log.

50. The method of claim 12, further comprising:
receiving a user response selecting one of the more than one of the plurality of contact records with a first data field value matching the received telephone number for storage in a call log; and
storing in a call log the received telephone number and information stored in a second data field of the selected one of the more than one of the plurality of contact records with a first data field value matching the received telephone number for storage in a call log.

51. The mobile device of claim 23, wherein the processor is configured with processor-executable instructions to perform steps further comprising:
receiving a user response identifying a group label; and
storing the received telephone number and the identified group label in call log.

52. The mobile device of claim 24, wherein the processor is configured with processor-executable instructions to perform steps further comprising:
receiving a user response selecting one of the more than one of the plurality of contact records with a first data field value matching the received telephone number for storage in a call log; and
storing in a call log the received telephone number and information stored in a second data field of the selected one of the more than one of the plurality of contact records with a first data field value matching the received telephone number for storage in a call log.

53. The mobile device of claim 35, further comprising:
means for receiving a user response identifying a group label; and
means for storing the received telephone number and the identified group label in call log.

54. The mobile device of claim 36, further comprising:
means for receiving a user response selecting one of the more than one of the plurality of contact records with a first data field value matching the received telephone number for storage in a call log; and
means for storing in a call log the received telephone number and information stored in a second data field of the selected one of the more than one of the plurality of contact records with a first data field value matching the received telephone number for storage in a call log.

55. The non-transitory computer-readable medium of claim 47, having stored thereon computer-executable instructions configured to cause a processor to perform operations further comprising:
receiving a user response identifying a group label; and
storing the received telephone number and the identified group label in call log.

56. The non-transitory computer-readable medium of claim 48, having stored thereon computer-executable instructions configured to cause a processor to perform operations further comprising:
receiving a user response selecting one of the more than one of the plurality of contact records with a first data field value matching the received telephone number for storage in a call log; and
storing in a call log the received telephone number and information stored in a second data field of the selected one of the more than one of the plurality of contact records with a first data field value matching the received telephone number for storage in a call log.

* * * * *